Nov. 2, 1965    R. E. HETRICK    3,215,350
PROTECTIVE-SHIELD-DEFINING, DEBRIS-DEFLECTING AIR GUN NOZZLE
Filed Jan. 27 1964
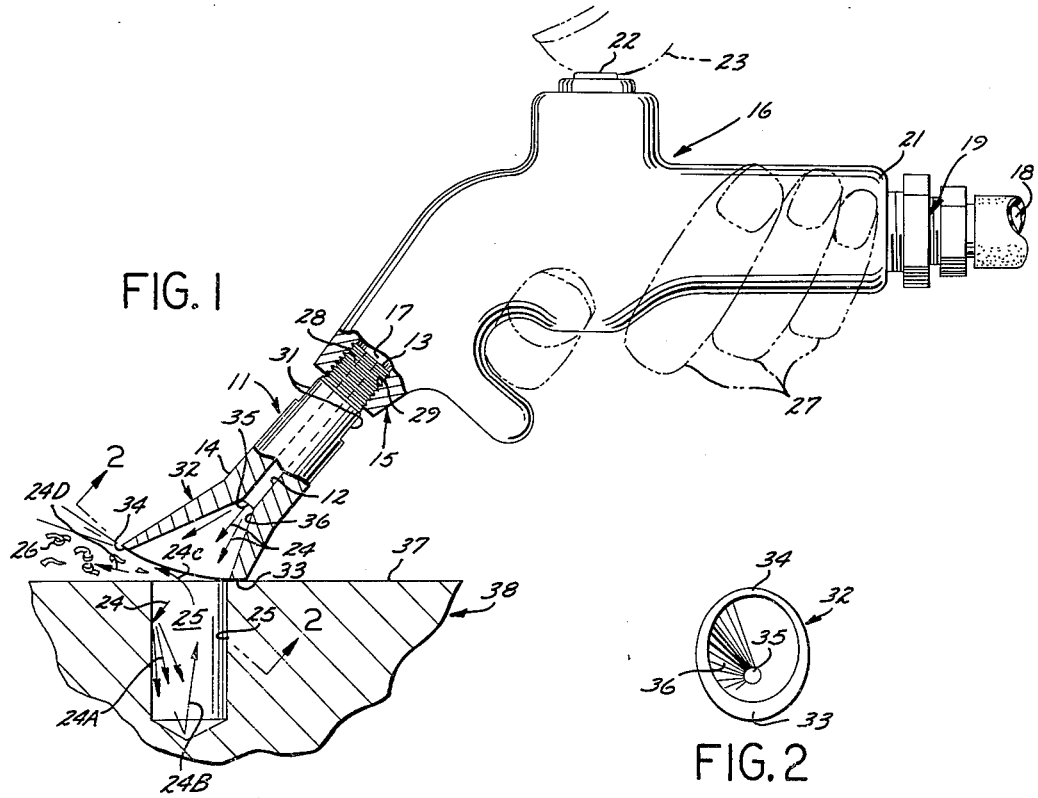
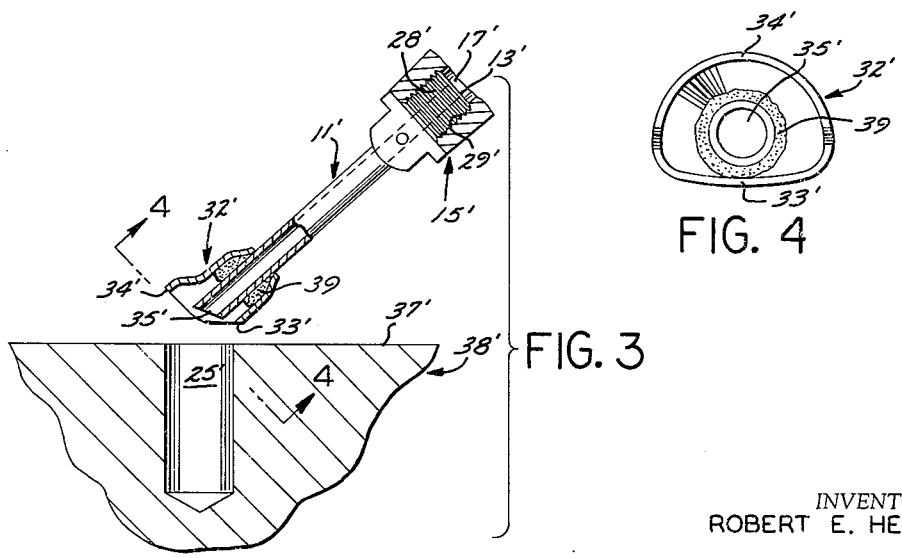
INVENTOR.
ROBERT E. HETRICK

United States Patent Office 3,215,350
Patented Nov. 2, 1965

3,215,350
PROTECTIVE-SHIELD-DEFINING, DEBRIS-DEFLECTING AIR GUN NOZZLE
Robert E. Hetrick, 10537 Sylvan St., Santa Ana, Calif.
Filed Jan. 27, 1964, Ser. No. 340,284
3 Claims. (Cl. 239—288)

Generally speaking, the present invention relates to an improved air gun nozzle of the type frequently used for blowing away debris resulting from manufacturing operations and, in particular, metal debris and chips resulting from machining operations such as the boring or drilling of a blind hole or recess, or the like. Under such conditions of use, it is conventional to use an air gun nozzle to blow out the metal chips or debris from the blind recess or hole for the purpose of inspection, for tapping the recess, or the like. However, this is an extremely dangerous operation because of the possibility that some of the metal debris and/or chips may be blown out of the blind recess or hole and upwardly into the face or eyes of the operator using the air gun for such hole-cleaning purposes. If such should happen, the metal debris or chips may become embedded in the operator's eye (or eyes) with consequent severe damage thereto. In some cases, this may result in the formation of a corneal ulcer or the like, and may result in blindness or at least substantial impairment of the eyesight.

In conventional prior art machine shop practice it is usually recommended that the operator of any of the equipment therein should wear a pair of safety glasses or goggles which are intended to prevent the entry of any foreign particles, such as metal debris or chips of the type referred to above, into either of the operator's eyes. This is a very effective safeguard but, unfortunately, is not popular with machine shop personnel for various reasons, including the inconvenience of wearing such goggles, the fact that they sometimes interfere with the operator's vision because of fogging as a result of moisture condensation or the like, and for a variety of other reasons. Therefore, the net result of this situation is the fact that very often an operator using an air gun for the blind hole or recess cleaning purposes outlined above, may not be wearing such safety goggles and may be exposed to the full danger of inadvertently blowing such metallic chips or debris into his eyes during such a blind hole or recess cleaning operation.

Therefore, the provision of means which would positively prevent the blowing of such metallic debris or chips into the eyes of the operator of an air gun during such a blind hole or recess cleaning operation and without requiring that said operator wear safety goggles, would be extremely desirable and this is precisely what the present invention provides. In other words, the novel apparatus of the present invention comprises a protective-shield-defining, debris-deflecting, air gun nozzle which allows the operator of the air gun to clean a blind hole or recess in the manner referred to above with no danger of any of the ejected metal particles or chips being blown into his eyes, since the novel protective-shield defined by the novel air gun nozzle of the present invention acts to deflect the metal particles or other debris away from the operator in a manner which positively prevents any of said chips from traveling toward the operator's face or eyes during such a blind hole or recess cleaning operation, when using the novel apparatus of the present invention on a conventional air gun.

With the above points in mind, it is an object of the present invention to provide a novel protective-shield-defining, debris-deflecting air gun nozzle having the advantages referred to hereinbefore and being of relatively simple, inexpensive construction adapted to be readily mounted with respect to the outlet portion of a conventional air gun, and capable of mass manufacture at relatively low cost whereby to be conducive to widespread use thereof.

Further objects are implicit in the detailed description which follows hereinafter (which is to be considered as exemplary of, but not specifically limiting, the present invention) and said objects will be apparent to persons skilled in the art after a careful study of the detailed description which follows hereinafter.

For the purpose of clarifying the nature of the present invention, two exemplary embodiments of the invention are illustrated in the hereinbelow-described figures of the accompanying single drawing sheet and are described in detail hereinafter.

FIG. 1 is a fragmentary partially broken-away side view, partly in elevation and partly in section, and illustrates one exemplary embodiment of the present invention in sealed mounted communicating relationship with respect to the outlet portion of a conventional controllably valved air gun which is adapted to be connected to a suitable source of air under pressure (not shown). This view illustrates the exemplary form of the invention in actual use during a blind hole or recess cleaning operation with the controllably operable valve of the air gun in digitally depressed open relationship. The debris-deflecting protective feature of the invention is clearly illustrated in this view.

FIG. 2 is an end elevational view of the novel protective-shield-defining, debris-deflecting, air gun nozzle of FIG. 1, taken generally in the direction of the arrows 2—2 or FIG. 1, and with all portions of the bored or drilled work piece and all portions of the air gun removed from this view for reasons of drawing simplicity and clarity.

FIG. 3 is a fragmentary view generally similar to FIG. 1, but illustrating a slightly modified form of the invention and also shows it in a slightly different operative relationship with respect to the bored or drilled work piece from that shown in FIG. 1.

FIG. 4 is an end elevational view, generally similar to FIG. 2, but taken in the direction of the arrows 4—4 of FIG. 3 and illustrating the modified form of the invention of FIG. 3.

Generally speaking, the exemplary first form of the invention illustrated in FIGS. 1 and 2 comprises a conduit or duct means, indicated generally at 11, which might be termed a longitudinal body portion having a longitudinal duct or aperture 12 extending longitudinally therethrough from one end 13 to the other end 14 and in substantial coaxial relationship and alignment with respect to the length thereof.

In said exemplary first form of the invention, said conduit or duct means, indicated generally at 11, is provided with controllably engageable coupling means at the rear end 13 thereof cooperable for sealed coupling attachment with respect to the forward pressurized-air, aperture egress or outlet portion or end, indicated generally at 15, of the conventional air gun, generally designated at 16, in a manner placing the longitudinal duct or aperture 12 in interior communication with the hollow interior 17 of the air gun 16 and, thereby also placing said longitudinal duct 12 in effective communication with a source of air under pressure (not shown) adapted to be connected to the hose 18 which is connected, by threaded fitting means 19, to the rear end 21 of the air gun 16.

It will be noted that the air gun 16 is provided with controllably operable valve means, of which only the operating or actuating portion 22 can be seen from the exterior of the air gun 16 of FIG. 1, and which is of an entirely conventional type adapted to normally be closed in a manner effectively disconnecting the pressurized air supply hose 18 from the forward pressurized-air, apertured egress or outlet end or portion 15 of the air gun 16 until such time as the actuating portion 22 of said valve is depressed by the operator's thumb, as indicated fragmentarily in phantom at 23 in FIG. 1, which will effectively open said valve means and communicate the pressurized air supply hose 18 with the apertured air egress outlet end 15 of the air gun 16 and thereby directly place pressurized air in communication with the longitudinal duct or aperture 12 in the conduit or duct mean 11 of the novel device of the present invention.

The above is clearly shown in FIG. 1 and allows pressurized air to be angularly downwardly and forwardly directed, as indicated by the arrows 24, into the interior of a blind hole or recess 25 so that chips or debris 26 can be deflected upwardly and outwardly therefrom as indicated by the sequential directional arrows 24A, 24B, 24C, and 24D. This causes the ejection of the chips 26 from the blind hole or recess 25 and also positively deflects said chips 26, comprising the debris, in the direction of the arrow 24D, which is away from the position of the operator of the air gun 16, who is holding same with the fingers 27 of one hand while operating the valve 22 with the thumb 23 of the same hand.

In the exemplary first form of the invention illustrated in FIGS. 1 and 2, the above-mentioned controllably engageable coupling means at the rear end of the conduit or duct means 11 and cooperable for sealed coupling engagement with respect to the forward pressurized-air, apertured egress or outlet end or portion 15 of the air gun 16, comprises exterior thread means 28 threadedly sealingly engageable and cooperable with respect to corresponding interior thread means 29 carried within the apertured air egress outlet end 15 of the air gun 16.

Furthermore, it should be noted that, in the exemplary first form of the invention illustrated in FIGS. 1 and 2, the conduit or duct means 11 is provided with torque-receiving means cooperable for engagement with an auxiliary torque-applying tool means, such as a wrench or the like, to facilitate the sealed engagement of the exterior threaded means 28 and the interior threads 29. In other words, the gripping jaws of such a torque-applying tool means (not shown since such are well known in the art) may be applied to the opposed flat surface portions 31 comprising said torque-receiving means in the exemplary first form of the invention illustrated so that considerable torque may be applied to the entire conduit or duct means, indicated generally at 11, for threading it into the interiorly threaded air egress outlet aperture portion 15 of the air gun 16 whereby to provide a strong mechanical junction therebetween and a positive air seal therebetween which may be further enhanced by conventional sealing means such as rings, sealing compound, or the like, if desired.

In the exemplary first form of the invention illustrated in FIGS. 1 and 2, the conduit or duct means indicated generally at 11 is provided at the forward end 14 thereof with an outwardly and forwardly conically diverging flared debris-deflecting portion defining a protective shield means, indicated generally at 32, in the form of a hollow circular cone having a cut-away portion at the bottom forward edge thereof as indicated at 33 which is shorter than the forward edge of the remainder thereof, as indicated at 34; said cut-away edge 33 being adapted to be positioned nearest to an operator of the air gun 16 when pressurized air is controllably ejected by said operator from the forward end 35 of said duct or aperture 12 toward debris in the blind recess 25 (such debris being shown at 26 in FIG. 1 after having been blown out of the blind recess 25). Of course, the forward end 35 of the longitudinal duct or aperture 12 communicates with an interior apex portion 36 of the hollow interior of the conical shield means 32 and is normally positioned in an angular downwardly directed relationship with the near bottom cut-away edge portion 33 of the hollow conical shield means 32 effectively comprising a work-contact edge adapted to be placed in an angular relationship on the top surface 37 of a work piece, such as is indicated generally at 38, in a relationship relative to the blind hole or recess 25 such as is clearly shown in FIG. 1. This provides an arrangement such that the debris, taking the form of metal chips 26 in FIG. 1, will be blown out of the blind hole or recess 25 and away from the operator of the air gun 16 so that the hole 25 can be safely cleaned with no danger of blowing the metal particles of debris 26 into the operator's face or eyes.

It should be noted that, in the exemplary first form of the invention illustrated, the conduit or duct means 11 and the conical debris-deflecting shield means 32 comprise an integral unitary member which can be screwed into the threaded air hole in the air egress outlet end 15 of substantially any standard air gun, such as the one at 16, thus making possible the quick and easy installation of the device into a relationship such as is clearly shown in FIG. 1.

FIGS. 3 and 4 illustrate a slight modification of the invention and functionally similar parts are indicated by similar reference numerals, primed, however. Furthermore, in view of the very close functional similarity of this modification of the invention to the first form of the invention shown in FIGS. 1 and 2 and described in considerable detail hereinbefore, the modified form of the invention shown in FIGS. 3 and 4 is not described in lengthy and repetitive detail.

However, it should be noted that the major differences of this modification of the invention lie in the fact that the conduit or duct means, indicated generally at 11', is of a different configuration from that of the first form of the invention and is provided with a rear threaded coupling portion 28' which is very slightly different structurally, but substantially the same functionally, to that of the first form of the invention. Also in this modification, the protective shield means indicated generally at 32' is of somewhat different configuration and is not integral with respect to the conduit or duct means 11', although it is rigidly attached thereto by sealing, fastening, or junction means 39 whereby said shield 32' and said conduit or duct means 11' effectively comprise a unitary member for all practical purposes. Otherwise, this modification of the invention is very similar to the first form of the present invention, and no further detailed description thereof is thought necessary since it would apparently be redundant in view of the very complete description of the first form of the invention set forth hereinbefore.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A protective-shield-defining, debris-deflecting air gun nozzle, comprising: conduit means having a duct extending therethrough from one end to the other thereof, said conduit means being provided with controllably engageable coupling means at the rear end thereof cooperable for sealed coupling attachment with respect to the apertured pressurized-air-egress and outlet portion of a conventional controllably valved air gun in a manner placing said duct in interior communication with said air gun and with a source of air under pressure adapted to be connected thereto, said coupling means comprising exterior thread means threadedly sealingly engageable and cooperable with respect to corresponding interior thread means carried by said apertured pressurized-air-egress and outlet portion of said air gun, said conduit means being provided with torque-receiving means cooperable for engagement with an auxiliary torque-applying tool means to facilitate the sealed engagement of said coupling means with respect to said apertured pressurized-air-egress and outlet portion of said air gun, said conduit means being provided at a forward end thereof with an outwardly and forwardly conically diverging and flared debris-deflecting portion defining a hollow protective shield means in the form of a hollow circular cone having a cut-away edge portion at a bottom edge thereof shorter than the edge of the remainder thereof and adapted to be positioned adjacent to an operator of the air gun when pressurized air is controllably ejected by said operator from the forward end of said duct of said conduit means toward debris which is to be blown away, said near bottom cut-away edge portion of said hollow conical shield means comprising a work-contact edge adapted to be placed in an angular relationship on the top surface of a work piece adjacent to debris which is to be broken away, said hollow conical protective shield means having a hollow interior of similar conical shape and having an interior apex portion communicating with the forward end of said duct of said conduit means.

2. A device as defined in claim 1, wherein said conduit means and said conical debris-deflecting protective shield means comprise an integral unitary member.

3. A device as defined in claim 1, wherein said conduit means and said conical debris-deflecting protective shield means are firmly attached together whereby to effectively comprise a unitary member.

References Cited by the Examiner
UNITED STATES PATENTS

| | | | |
|---|---|---|---|
| 998,126 | 7/11 | Sherk | 239—288 |
| 1,055,411 | 3/13 | McWilliams et al. | 239—104 |
| 1,274,269 | 7/18 | Huffer | 239—288 |
| 1,462,861 | 7/23 | Jordan | 239—104 |
| 1,510,175 | 9/24 | Kinnear | 239—288 |
| 1,760,274 | 5/30 | Minor | 239—288 |
| 2,051,182 | 8/36 | Saunders | 239—104 |
| 2,566,878 | 9/51 | Fahrenkrog et al. | 239—288 |
| 2,797,963 | 7/57 | Wilson | 239—150 |
| 2,893,648 | 7/59 | Berry | 239—288 |
| 2,928,610 | 3/60 | Fenimore | 239—288 |

EVERETT W. KIRBY, *Primary Examiner.*